UNITED STATES PATENT OFFICE.

OTTO VENTER, OF CHEMNITZ, GERMANY.

PROCESS OF PURIFYING WASTE MERCERIZATION-LYES.

967,272. Specification of Letters Patent. Patented Aug. 16, 1910.

No Drawing. Application filed March 2, 1908. Serial No. 418,900.

*To all whom it may concern:*

Be it known that I, OTTO VENTER, a subject of the German Emperor, and residing at Chemnitz, Germany, have invented a certain new and useful Improved Process of Purifying Waste Mercerization-Lyes, of which the following is a specification.

The subject matter of the present invention is an improved process for purifying waste mercerization lyes.

After the soda-lye is removed from the piece of fabric impregnated with soda-lye this waste lye contains soluble starch, dextrin and a percentage of sodium carbonate. Now the object of this invention is to remove these impurities. For this purpose the waste is to be treated with such a quantity of caustic lime that is considerably greater than the quantity requisite for the caustification.

It may be mentioned by way of example that 200 liters of waste-lye are brought to boiling, after which 100 kilograms of caustic lime are added and as well 30 kilograms soda, the whole being heated until the caustification is completed. Thereby a precipitate is obtained, which must be removed. The percentage of the impurities above mentioned is thereby reduced from 2% to 0.2%. Of the 100 kilograms of lime only 10 to 15 or less would be necessary for the caustification.

A modification of the process consists in substituting one portion of the lime by strontia or baryta. By adding strontia or baryta a slimy precipitate is produced, which is completely carried down by the existing precipitate of lime. The purifying takes place almost instantaneously.

Example: To 1 cubic meter of the above mentioned waste-lye of 12° Baumé are added 100 kilograms barium hydrate, 100 kilograms lime and 30 kilograms calcined soda. The waste-lye is first heated to boiling, the barium hydrate, previously dissolved in hot water, is then added thereto and after some time the lime is added and finally the carbonate of soda, after which the whole is heated preferably by a gentle simmer at about 100° C. until the caustification is completed. It is then allowed to cool down to about 50° to 80° C. and filtered or separated by settling and decantation. The precipitates obtained, which still contain a small quantity of lye are then washed with water, which water may be employed for the next purifying operations, for instance to dissolve the soda. The precipitates thus treated may be regenerated in some of the customary ways, for example, by mixing the same with coal-dust, pressing the mixture into bricks and heating the latter red hot in a reverberatory furnace. An almost equally good result is obtained if, in working as above 250 kilograms of lime are employed together with 10 kilograms barium hydrate.

I claim:—

1. The process of purifying waste mercerization lyes, consisting in boiling the lye, then adding thereto a quantity of caustic lime and a hydrate of another alkaline earth metal dissolved in hot water, which quantity is considerably in excess of the quantity requisite for caustification, then adding soda thereto, heating the whole until the caustification is completed, whereby a precipitate is obtained, and then removing the precipitate.

2. The process of purifying waste mercerization lyes, consisting in boiling the lye, adding thereto barium hydrate dissolved in hot water, then adding a quantity of caustic lime, which is considerably in excess of the quantity of lime requisite for caustification, then adding soda thereto, heating the whole until the caustification action is completed, whereby a precipitate is obtained and then removing the precipitate.

In testimony whereof, I affix my signature in the presence of two witnesses.

OTTO VENTER.

Witnesses:
WILHELM J. KOUJETSUY,
HERBERT APPLEYARD.